United States Patent [19]

Ruda

[11] 4,230,366
[45] Oct. 28, 1980

[54] AUTOMOTIVE SEAT WITH BUILT-IN CHILD RESTRAINT

[75] Inventor: Günter Ruda, Wettstetten, Fed. Rep. of Germany

[73] Assignee: Audi NSU Auto Union AG, Neckarsulm, Fed. Rep. of Germany

[21] Appl. No.: 5,779

[22] Filed: Jan. 23, 1979

[30] Foreign Application Priority Data

Jan. 27, 1978 [DE] Fed. Rep. of Germany ....... 2803574

[51] Int. Cl.² ............................................. A62B 35/00
[52] U.S. Cl. .................................. 297/487; 280/748; 297/117; 297/216
[58] Field of Search ............... 297/390, 117, 238, 216, 297/487, 488; 280/748, 743

[56] References Cited

U.S. PATENT DOCUMENTS

| 2,584,481 | 2/1952 | Mast et al. | 297/115 |
| 3,453,026 | 7/1969 | Paes et al. | 297/487 |
| 3,623,768 | 11/1971 | Capener | 297/390 |
| 3,713,694 | 1/1973 | Miller | 297/390 |
| 3,753,576 | 8/1973 | Gorman | 297/488 |
| 3,888,329 | 6/1975 | Monaghan | 297/390 X |
| 3,899,042 | 8/1975 | Bonar | 297/390 |
| 3,951,450 | 4/1976 | Gambotti | 297/238 |
| 4,005,877 | 2/1977 | Humphries | 297/390 X |
| 4,082,350 | 4/1978 | Tomforde | 297/488 X |

FOREIGN PATENT DOCUMENTS

| 1318721 | 6/1962 | France | 297/487 |
| 2307673 | 11/1975 | France | 297/238 |
| 1417976 | 12/1975 | United Kingdom | 297/488 |

Primary Examiner—James T. McCall
Attorney, Agent, or Firm—Karl F. Ross

[57] ABSTRACT

An automotive vehicle seat has a portion of its back part or seat part which can be pivoted or slid into a position above the sitting surface of the seat part and in front of the leaning surface of the back part. This portion is U-shaped and constitutes a passive child restraint having a pair of parallel legs extending in the direction of travel and a front cross piece, all padded. When out of use the U-shaped restraint bar may be pushed back level with the front surface of the back part of the seat or the top surface of the seat part of the seat.

15 Claims, 8 Drawing Figures

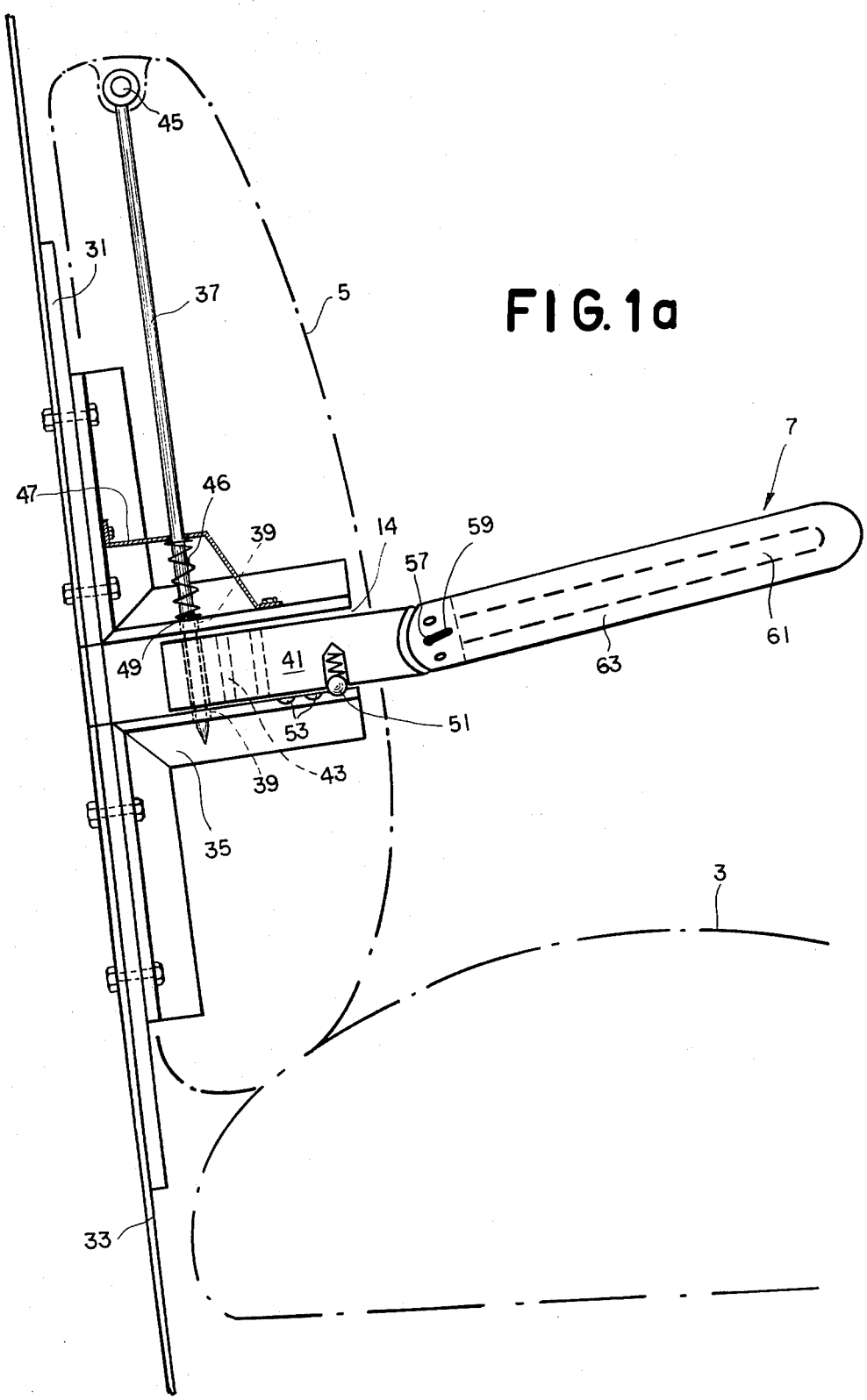

AUTOMOTIVE SEAT WITH BUILT-IN CHILD RESTRAINT

FIELD OF THE INVENTION

The present invention relates to an automotive-vehicle seat having a child restraint. More particularly this invention concerns a child restraint which is built into the automotive seat.

BACKGROUND OF THE INVENTION

An infant should normally be held positively in place when a passenger in an automotive vehicle. The seats normally provided for adults are usually inadequate for securing a child in place, first of all because they are so widely spaced as to leave considerable room for side-to-side motion, and secondly because they hold the child normally so very low in the seat that he or she is unable to see out and is therefore unhappy and uncomfortable.

Accordingly the standard practice, as seen in German utility model No. 7,339,423, has been to provide a special chair or carrier for the child which can be rested on the seat and held in place by the normally provided seat belt. Such an arrangement provides an excellent side-to-side and forward-and-backward protection for the child, while at the same time elevating the seating location so that the child can see out the windows. Nonetheless such an arrangement must be specially mounted in the vehicle each time it is to be used, and must be removed when the seat is to be used by an adult. These difficulties therefore violate a basic premise of such a safety device: that they be so convenient that the user is never tempted to neglect them.

It has also been suggested in German utility model No. 7,612,141 to build a system right into the vehicle seat. This is done by providing a fold-down arm rest that, when folded down, forms a recess in the back part of the automotive-vehicle seat while simultaneously constituting a raised sitting cushion for an infant. This arrangement has been found unsatisfactory in that it places the infant in a laterally closed recess from which there is virtually no visibility to the side. Similarly the folded-down armrest is relatively long so that the infant's legs must either extend straight forwardly, or he or she must straddle the arm rest, frequently an uncomfortable position. What is more locking the belts in front of the infant in order to secure him or her in place is a frequently cumbersome task that the user is tempted to neglect.

OBJECTS OF THE INVENTION

It is therefore an object of the present invention to provide an improved built-in child restraint for an automotive-vehicle seat.

Another object is to provide such a restraint which passively protects the child both for front-and-back movement and for side-to-side movement, while still leaving the child a full degree of visibility to the front and sides.

Another object is to provide such a child restraint which can easily be fitted around the child or through which the child can easily be fitted, yet which is comfortable once the child is in place.

A further object is to provide a child restraint which when not in use can easily be eliminated so as to leave a normal adult-passenger seat.

SUMMARY OF THE INVENTION

These objects are attained according to the instant invention in a motor-vehicle seat, normally the back seat, wherein a rigid bar element is mounted for displacement relative to back or seat part between a use position above the upper surface of the seat part and in front of the front surface of the back part and a storage position generally level with one of these surfaces. Thus a child sitting on the seat behind the bar in the use position thereof is securely protected, while at the same time when the bar is in the storage position it is level with the upper surface of the seat part or the front surface of the back part of the seat.

According to this invention the bar is U-shaped, having two legs extending in the direction of travel and normally laterally flanking the child in the use position, and a front connecting part spanning the two legs and positioned in front of the child in the use position. This bar is padded or upholstered and is arranged to loosely receive the child so that there is no belt or the like to chafe the child, while at the same time a very strong protection is provided. In the storage position this padded bar becomes level with and, indeed, part of either the seat part or the back part of the automotive-vehicle seat.

In accordance with one feature of this invention a U-shaped part of the seat part can be vertically displaced relative to a small central portion thereof. Thus the outer portion of the seat part is swung up, normally on a plurality of lockable scissor linkages, and the infant sits within the raised portion on the unraised portion of the seat part.

It is also within the scope of this invention to have the U-shaped bar pull drawer-fashion out of the back part of the seat. In this arrangement means may be provided for vertically adjusting the bar by pivoting for accommodating children of different heights. Similarly means may be provided for locking the bar in any plurality of positions offset in a direction generally perpendicular to the seat back.

Finally the present invention envisages making the U-shaped bar swing down from an upstanding position flush with the seat back and having its connecting part forming a head rest for an adult user of the seat position, and a down position constituting the use position. When in the lowered or use position a somewhat smaller passenger will be using the seat position so that a headrest will no longer be necessary at adult-head level. The latter arrangement can advantageously be combined with an arm rest at the seat position, so that in case a very small infant is being held the arm rest can be swung down and the infant can sit on the arm rest while surrounded by the U-shaped padded bar. When the bar is up the arm rest can be used by the other back seat passenger if desired, or the arm rest can be swung up to provide an adult seat.

It is possible to mount several such arrangements in the seat, so that several children can be securely accommodated at the same time. Similarly it is possible for the swing-down arrangement described above to be used as a simple arm rest by adult passengers sitting to either side of it.

BRIEF DESCRIPTION OF THE DRAWING

FIG. 1a is a side partly sectional view of the arrangement of FIG. 1;

SPECIFIC DESCRIPTION

Figure 1:
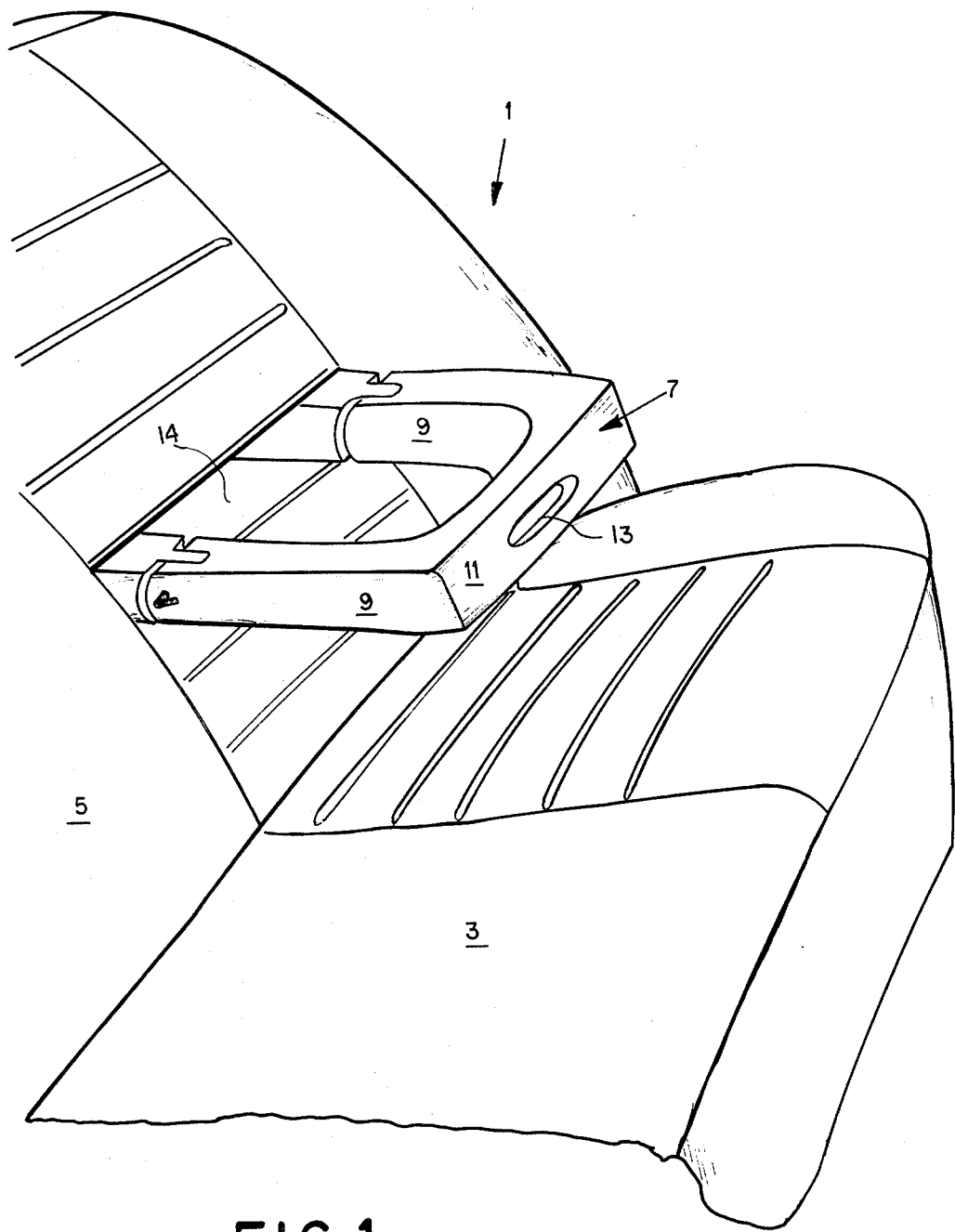
FIG. 1 is a perspective view of a seat according to this invention.

As shown in FIG. 1a a rear automotive-vehicle seat 1 has a seat part 3 and a back part 5, and is provided with a passive child restraint 7. This restraint 7 is U-shaped, having a pair of arms 9 extending parallel to each other in the direction of travel and a front cross piece 11. The entire U-shaped restraint 7 can be pulled drawer-fashion from a slot 14 in the seat back 5 by means of a hand hole 13.

As shown in FIG. 1 the back part 5 is mounted on a rear wall 33 of the passenger compartment, which rear wall 33 carries a mounting plate 31 in turn carrying a pair of L-shaped guides 35. A rear end part 41 of each of the legs 9 is received between these guides 35 and has a plurality of throughgoing holes 43 through which a rod 37 engageable through holes 39 in the guides 35 may pass. To this end the rod 37 is biased downwardly by a spring 46 engaging an abutment 47, and has at its upper end a handle 45. Thus the user may lift the handle 45 to disengage the tip of the rod 37 from any of the holes 43 to allow horizontal positioning of the U-shaped restraint 7 in a direction perpendicular to the seat back 5. A spring-loaded ball 51 engages in recesses 53 of the lower guide 35 to establish positions for the restraint 7, and a stop 49 on the rear portions 41 can engage with the abutment 47 to prevent complete pulling-out of the restraint 7.

One rod 37 may be provided for the entire U-shaped restraint 7, or two such rods 37 may be provided. It is also possible to mount a single such handle 45 between two such rods 37 so that they can be operated together.

The U-shaped restraint 7 is formed by a central rigid bar 61 surrounded by padding 63. In addition it can pivot on the rear parts 41 about a pivot axis 57 and can be locked in any position by means of a tightening handle 59. Thus when a tall child is to be held within the restraint 7 the front part is tipped up and locked in place, whereas for a smaller child it can be tipped down and locked in place. For recessing in the slot 14 the front part of the restraint 7 is aligned with the rear portions 41.

FIG. 1 shows how the seat provided with this restraint has a horizontal pattern on it so that when not in use the child restraint is not even readily noticeable.

Figure 2:
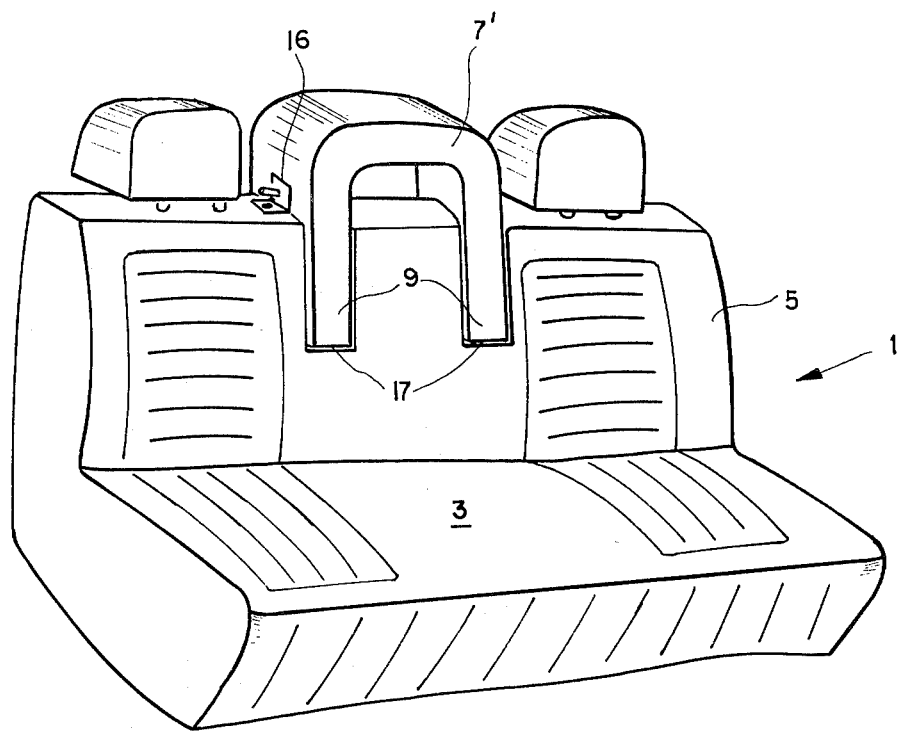
FIGS. 2 and 3 are perspective views in the storage and use position, respectively, of another arrangement according to the present invention.
Figure 3:
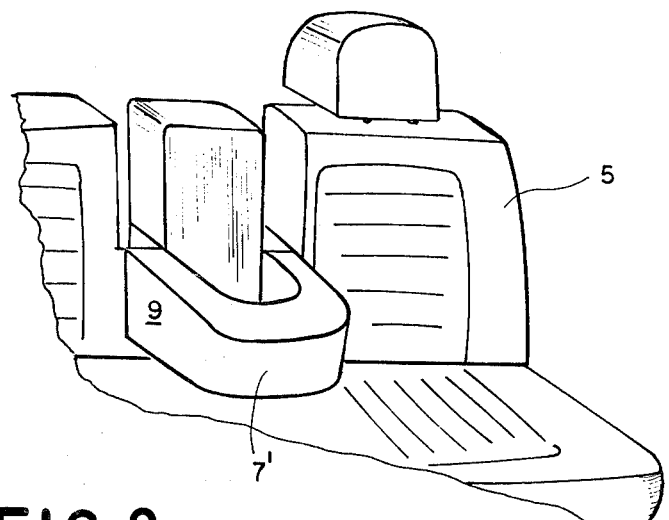

FIGS. 2 and 3 show another arrangement wherein a U-shaped padded restraint 7' can be swung between an upright position shown in FIG. 2 where it forms a head rest and a down or use position in which it acts as a passive child restraint. To this end the lower or rear ends of the side pieces 9 of the U-shaped restraint 7' are received in slots 17 formed in the seat back 5. A latching arrangement 16 is provided to hold the restraint 7' in the storage or upper position.

Figure 4:
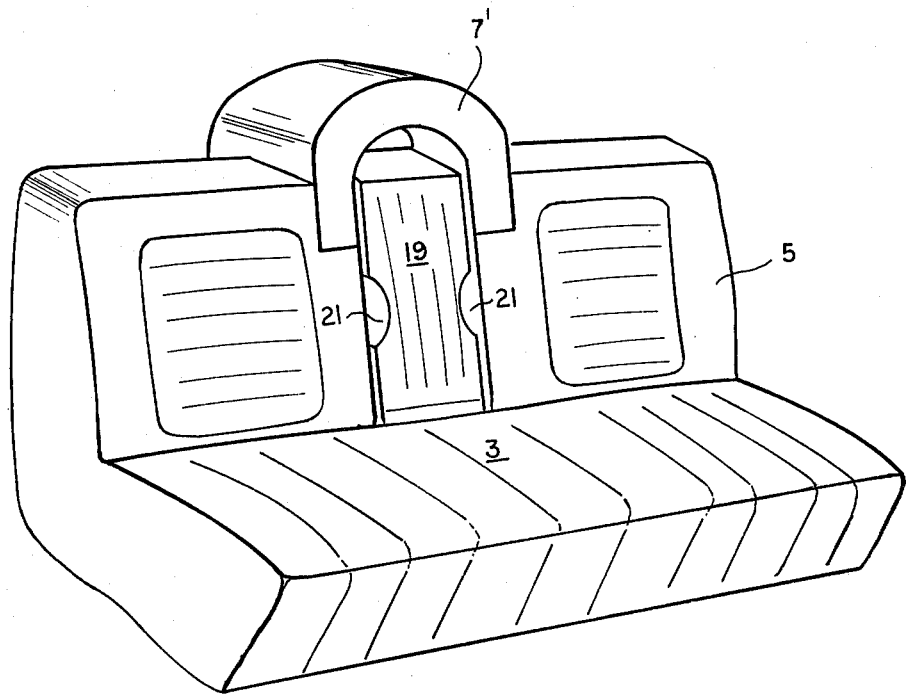
FIGS. 4 and 5 are perspective and side views of a third arrangement according to this invention.
Figure 5:
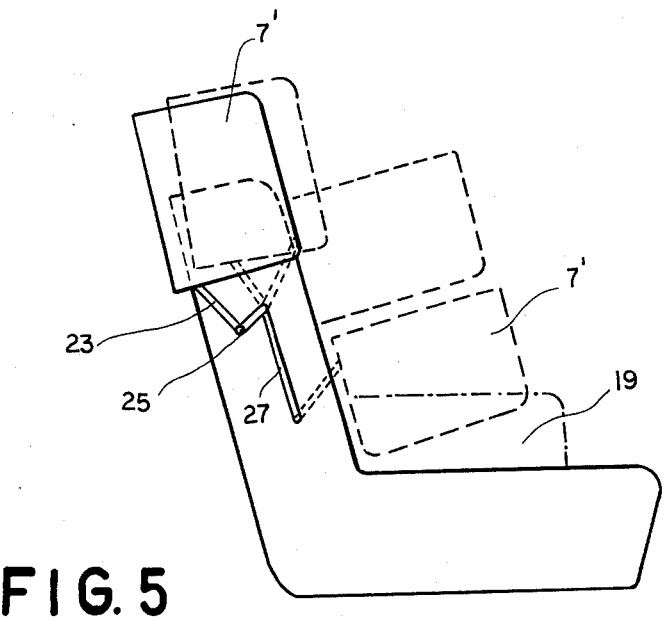

An arrangement is shown in FIGS. 4 and 5 which is identical to that of FIGS. 2 and 3, except that an arm rest 19 is provided between the legs of the restraint 7'. This arm rest 19 has lateral cutouts 21 adapted to receive the legs of an infant or child sitting on it when in the down position illustrated in dot-dash lines in FIG. 5. In addition in this arrangement the restraint 7' is not simply pivoted, but is mounted via a pair of arms 23 having respective pins 25 in grooves in the seat back 5. Thus to bring the restraint 7' down it must first be lifted, then tipped forward, then dropped down. When fully down it will constitute a firm restraint. At the same time a child received within the restraint 7' will be able to sit up on the arm rest 19 to have a clear view out of the vehicle. For a larger child the arm rest 19 can be left up. It should also be noted that when the restraint 7' is in the upper storage position the arm rest 19 can be used by adult passengers to either side of it.

Figure 6:
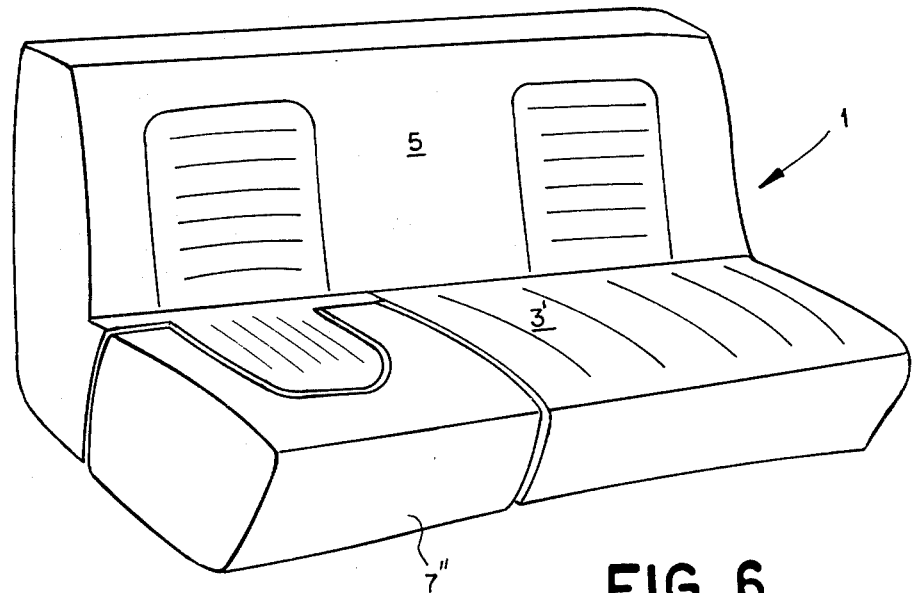
FIGS. 6 and 7 are perspective views in the storage and use positions, respectively, of yet another arrangement according to the instant invention.
Figure 7:
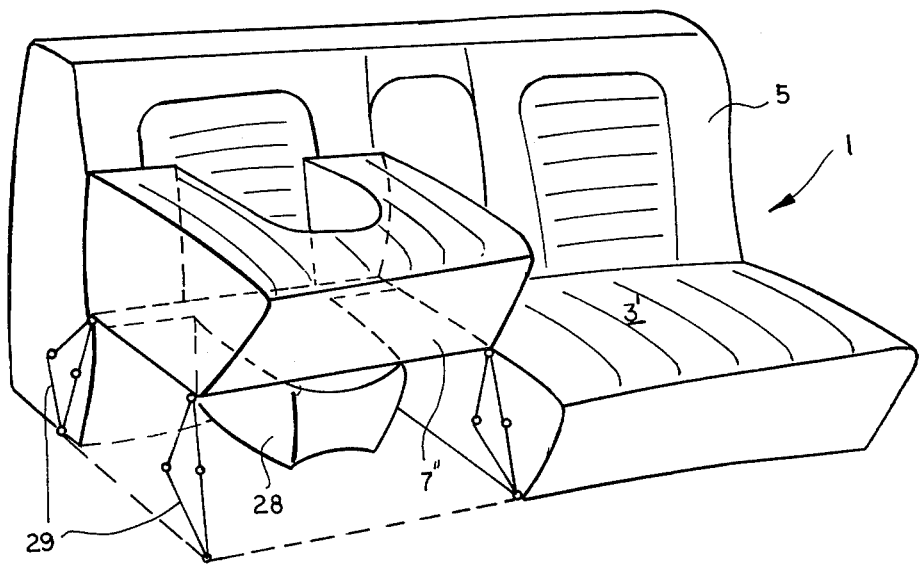

Finally, FIGS. 6 and 7 show yet another arrangement wherein the seat part 3' has a portion 7" of U-shape which can be raised up on scissor linkages shown diagrammatically at 29 and locked above a fixed central portion 28 of the seat part 3'. When thus raised the portion 7" constitutes a large and soft child restraint. The scissor linkages 29 can also be of the toggle type which lock when in the up position. Alternately they may be provided with special locking devices to prevent accidental dropping of the portion 7" once it has been slid vertically into the up position illustrated in FIG. 7.

When the portion 7" is in the up position, the legs of a child sitting on the central portion 28 can hang over the front of this portion 28, while the child is effectively protected forwardly and laterally by the portion 7".

We claim:

1. In combination with an automotive-vehicle seat having a seat part with an upper sitting surface and a back part with a front leaning surface, a child restraint comprising:
   a rigid U-shaped bar element; and
   means for displacing said bar element relative to said parts between a use position above said upper surface, open backwardly, and in front of said front surface and a storage position generally level with one of said surfaces, whereby a child sitting on said seat behind said bar in said use position is surrounded by said bar.

2. The child restraint defined in claim 1 wherein said means includes a pivot for swinging said bar through generally 90° between said positions, said one surface being said front leaning surface.

3. The child restraint defined in claim 2 wherein in said storage position said bar is positioned above said seat back and forms a head rest.

4. The child restraint defined in claim 2 wherein said bar is U-shaped and has a pair of legs each having a rear end at said pivot and a front end, and a connecting part joining said front ends and extending generally parallel to said surfaces, said legs extending generally parallel to said sitting surface in said use position and generally parallel to said leaning surface in said storage position.

5. The child restraint defined in claim 4 wherein said seat back is provided with an arm rest between said legs and displaceable between an up position forming a continuation of said leaning surface and a down position resting on said sitting surface, whereby in said down position a child can sit on said arm rest between said legs and behind said connecting part.

6. In combination with an automotive-vehicle seat having a seat part with an upper sitting surface and a back part with a front leaning surface, a child restraint comprising:

a rigid bar element slidable generally parallel to said sitting surface between a use position above said upper surface and in front of said front surface and a storage position generally level with one of said surfaces, whereby a child sitting on said seat behind said bar in said use position is protected by said bar; and means for sliding said bar element generally parallel to said sitting surface between said positions.

7. The child restraint defined in claim 6 wherein said bar is U-shaped and has two generally parallel legs generally parallel to said sitting surface and a connecting part joining said legs and also generally parallel to said sitting surface.

8. The child restraint defined in claim 7, further comprising means for limitedly pivoting said bar about a horizontal axis generally parallel to said front surface and for locking said bar in any of a plurality of angularly offset positions to compensate for children of different heights.

9. The child restraint defined in claim 7, further comprising means for fixing said bar in any of a plurality of positions spaced apart in a direction generally parallel to said sitting surface and generally perpendicular to said leaning surface.

10. The child restraint defined in claim 1 wherein said seat includes a generally vertically extending guide, said bar being vertically displaceable by sliding along said guide between said positions.

11. The child restraint defined in claim 10 wherein said bar lies above and generally flush with said seat back in said storage position and is pivotal through generally 90° and slidable down said guide into said use position.

12. The child restraint defined in claim 1 wherein said bar is recessed in said seat part in said storage position and is vertically displaceable between said positions.

13. The child restraint defined in claim 12 wherein said means includes a plurality of scissor linkages carrying said bar.

14. The child restraint defined in claim 1 wherein said bar is padded.

15. The child restraint defined in claim 1, further comprising means for locking said bar in each of said positions.

* * * * *